(12) United States Patent
Kurita et al.

(10) Patent No.: US 7,626,746 B2
(45) Date of Patent: Dec. 1, 2009

(54) SHUTTER UNIT AND LASER PROCESSING DEVICE USING SAME

(75) Inventors: Norio Kurita, Hamamatsu (JP); Tetsuya Osajima, Hamamatsu (JP); Masayoshi Kusunoki, Hamamatsu (JP); Tatsuya Suzuki, Hamamatsu (JP); Toshimitsu Wakuda, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 439 days.

(21) Appl. No.: 10/577,550

(22) PCT Filed: Nov. 4, 2004

(86) PCT No.: PCT/JP2004/016340

§ 371 (c)(1),
(2), (4) Date: Mar. 14, 2007

(87) PCT Pub. No.: WO2005/043217

PCT Pub. Date: May 12, 2005

(65) Prior Publication Data

US 2007/0273950 A1    Nov. 29, 2007

(30) Foreign Application Priority Data

Nov. 4, 2003    (JP) .............................. 2003-374769

(51) Int. Cl.
*G02B 26/08*    (2006.01)
(52) U.S. Cl. .................. 359/236; 359/230; 359/234
(58) Field of Classification Search ................... 359/236
See application file for complete search history.

(56) References Cited

U.S. PATENT DOCUMENTS 3,574,445 A * 4/1971 Harmon ...................... 359/233

(Continued)

FOREIGN PATENT DOCUMENTS

JP    57-042003    3/1982

(Continued)

OTHER PUBLICATIONS

K. Hayashi; "Inner Glass Marking by Harmonics of Solid-State Laser", Proceedings of 45th Laser Materials Processing Conference, Dec. 1998, pp. 23-28.

(Continued)

*Primary Examiner*—James Phan
(74) *Attorney, Agent, or Firm*—Drinker Biddle & Reath LLP (57) ABSTRACT

A shutter unit capable of preventing the scattering of the laser beam upon closing the optical path of the laser beam and capable of being miniaturized, and a laser processing device employing such a shutter unit. In a shutter unit 1, when the optical path of the laser beam L is opened, a rotating member 57 is rotated around an axis line γ, and an opening 61 is positioned on an optical axis α so as to pass the laser beam L therethrough. Meanwhile, when the optical path of the laser beam L is closed, the rotating member 57 is rotated and a reflective surface 62 is positioned on the optical axis α so as to reflect the laser beam L. Here, since the reflected laser beam L is absorbed by an optical absorption member 63, it is possible to prevent the scattering of the laser beam L when the optical path of the laser beam L is closed. In addition, since the opening 61 and reflective surface 62 are both formed on the rotating member 57 which rotates around the axis line γ that is substantially orthogonal to the optical axis α, it is possible to reduce the size of the shutter unit 1.

3 Claims, 7 Drawing Sheets

U.S. PATENT DOCUMENTS

| | | | |
|---|---|---|---|
| 3,736,402 A | 5/1973 | Mefferd et al. | |
| 3,931,593 A | 1/1976 | Marshall | |
| 4,799,767 A | 1/1989 | Woodruff | 350/269 |
| 4,946,256 A | 8/1990 | Woodruff | 350/269 |
| 5,032,005 A | 7/1991 | Woodruff | 350/269 |

FOREIGN PATENT DOCUMENTS

| | | |
|---|---|---|
| JP | 59-061587 | 4/1984 |
| JP | 01-191117 | 8/1989 |
| JP | 01-227119 | 9/1989 |
| JP | S63-145747 | 5/1990 |
| JP | 03-189086 | 8/1991 |
| JP | 07-193300 | 7/1995 |
| JP | 2683836 | 8/1997 |
| JP | 10-034368 | 2/1998 |
| JP | 2578868 | 5/1998 |
| JP | 3014755 | 12/1999 |
| JP | 2000-057817 | 2/2000 |
| JP | 2000-252551 | 9/2000 |
| JP | 3734812 | 10/2005 |

OTHER PUBLICATIONS

K. Miura et al., "Formation of Photo-Induced Structures in Glasses with Femtosecond Laser", Proceedings of $42^{nd}$ Laser Materials Processing Conference, Nov. 1997, pp. 105-111.

T. Sano et al., "Evaluation of Processing Characteristics of Silicon with Picosecond Pulse Laser", Preprints of the National Meeting of Japan Welding Society, No. 66, Apr. 2000, pp. 72-73 (with at least partial English translation).

* cited by examiner

SHUTTER UNIT AND LASER PROCESSING DEVICE USING SAME

TECHNICAL FIELD

The present invention relates to a shutter unit for selectively opening and closing the optical path of a laser beam, and to a laser processing device employing such a shutter unit.

BACKGROUND ART

As this kind of conventional shutter unit, an optical shutter is described in Patent Document 1, and a shutter mechanism of a laser processing machine is described in Patent Document 2.

With the optical shutter described in Patent Document 1, a cylindrical shutter unit which rotates around an axis line that is orthogonal to an optical axis of a laser beam is disposed on the optical path of the laser beam, and a through hole is formed along the optical axis of the laser beam on the side wall of this shutter unit. In this optical shutter, when opening the optical path of the laser beam, the through hole is positioned on the optical axis of the laser beam so as to pass the laser beam therethrough, and, contrarily, when closing the optical path of the laser beam, the through hole is moved from the position on the optical axis of the laser beam so as to block the laser beam with the side wall of the shutter unit.

Further, with the shutter mechanism of the laser processing machine described in Patent Document 2, a through hole and a reflective mirror are respectively provided to a position facing each other across the center of rotation in a laser beam blocking plate which rotates around an axis line that is parallel to the optical axis of the laser beam. In this shutter mechanism, when opening the optical path of the laser beam, the through hole is positioned on the optical axis of the laser beam so as to pass the laser beam therethrough, and, contrarily, when closing the optical path of the laser beam, the reflective mirror is positioned on the optical axis of the laser beam so as to reflect the laser beam toward a damper.

Patent Document 1: Japanese Patent Laid-Open Publication No. H7-193300

Patent Document 2: Japanese Patent Laid-Open Publication No. H10-34368

DISCLOSURE OF THE INVENTION

Problem to be Solved by the Invention

Nevertheless, with the optical shutter described in Patent Document 1, since the shutter unit is of a cylindrical shape, the laser beam blocked with the side wall thereof will scatter, and, in some cases, a part of the scattered laser beam may return to the laser oscillator.

Further, with the shutter mechanism of the laser processing machine described in Patent Document 2, since a through hole and a reflective mirror are respectively provided to a position facing each other across the center of rotation in a laser beam blocking plate, it is difficult to reduce the size of the shutter mechanism.

Accordingly, in light of the foregoing circumstances, an object of the present invention is to provide a shutter unit capable of preventing the scattering of the laser beam upon closing the optical path of the laser beam and capable of being miniaturized, and also to provide a laser processing device employing such a shutter unit.

Means for Solving Problem

In order to achieve the foregoing object, the shutter unit according to the present invention for selectively opening and closing the optical path of a laser beam comprises: a rotating member which rotates around the axis line that is substantially orthogonal to the optical axis of the laser beam, and which has formed thereon an opening for passing the laser beam therethrough and a reflective surface for reflecting the laser beam; and an optical absorption member for absorbing the laser beam reflected with the reflective surface.

In this shutter unit, when the optical path of the laser beam is to be opened, a rotating member is rotated around an axis line which intersects substantially orthogonally with the optical axis of the laser beam to position an opening on the optical axis of the laser beam so as to pass the laser beam therethrough. Meanwhile, when the optical path of the laser beam is to be closed, the rotating member is rotated and a reflective surface is positioned on the optical axis of the laser beam so as to reflect the laser beam. Here, since the reflected laser beam is absorbed with an optical absorption member, it is possible to prevent the scattering of the laser beam when the optical path of the laser beam is closed. In addition, since the opening for passing a laser beam and reflective surface for reflecting a laser beam are both formed on the rotating member which rotates around the axis line that is substantially orthogonal to the optical axis, it is possible to reduce the size of the shutter unit.

Further, it is preferable that the rotating member has a base portion which rotates around the axis line, and an inclined plate extending from the base portion to the optical axis side and inclined toward the axis line side; and the opening is formed between the base portion and the inclined plate, and the reflective surface is formed on the outer surface of the inclined plate in relation to the axis line. As a result of adopting the foregoing constitution, it is possible to seek the simplification of the rotating member structure and the miniaturization of the rotating member. In addition, since the rotational stroke of the rotating member between the state where the opening is positioned on the optical axis of the laser beam and the state where the reflective surface is positioned on the optical axis of the laser beam will be short, it is possible to increase the switching speed of opening and closing the optical path of the laser beam.

Moreover, it is preferable to further comprise a drive motor having a rotational shaft disposed on the axis line, and that the rotating member is mounted on the rotational shaft. As described above, since the rotating member is directly mounted on the rotational shaft of the drive motor, it is possible to seek the simplification of the shutter unit structure.

Further, it is preferable that the reflective surface reflects the laser beam in a direction substantially parallel to the axis line, and the optical absorption member is disposed on the optical axis of the laser beam reflected with the reflective surface. As a result, the layout of the respective structural components will become efficient, and it is possible to further reduce the size of the laser unit.

Moreover, it is preferable to further comprise a first photo interrupter; and a second photo interrupter; and that the rotating member is provided with a light blocking plate for blocking the optical path of the first photo interrupter when the opening is positioned on the optical axis, and blocking the optical path of the second photo interrupter when the reflective surface is positioned on the optical axis. As a result of adopting the foregoing constitution, the first photo interrupter is able to detect the opening of the optical path of the laser beam, and the second photo interrupter is able to detect the closing of the optical path of the laser beam.

Further, the laser processing device according to the present invention comprises a shutter unit for selectively opening and closing the optical path of a laser beam for processing an object to be processed, wherein the shutter unit comprises a rotating member which rotates around the axis line that is substantially orthogonal to the optical axis of the laser beam, and which has formed thereon an opening for passing the laser beam therethrough and a reflective surface for reflecting the laser beam; and an optical absorption member for absorbing the laser beam reflected with the reflective surface.

Since this laser processing device employs the shutter unit according to the present invention described above, it is possible to prevent the scattering of the blocked laser beam upon closing the optical path of the laser beam, and it is further possible to reduce the size of the shutter unit.

Effect of the Invention

According to the present invention, it is possible to prevent the scattering of the blocked laser beam when the optical path of the laser beam is closed, and it is further possible to reduce the size of the shutter unit.

EXPLANATIONS OF NUMERALS

1 . . . laser processing device; 14 . . . shutter unit; 55 . . . drive motor; 56 . . . rotational shaft; 57 . . . rotating member; 58 . . . base portion; 59 . . . inclined plate; 61 . . . opening; 62 . . . reflective surface; 63 . . . optical absorption member; 64 . . . first photo interrupter; 65 . . . second photo interrupter; 66 . . . light blocking plate; $\alpha, \delta$ . . . optical axis; $\gamma$ . . . axis line; L . . . laser beam; S . . . object to be processed.

BEST MODES FOR CARRYING OUT THE INVENTION

The preferred embodiments of the shutter unit and laser processing device according to the present invention are now explained in detail with reference to the drawings.

Figure 1:
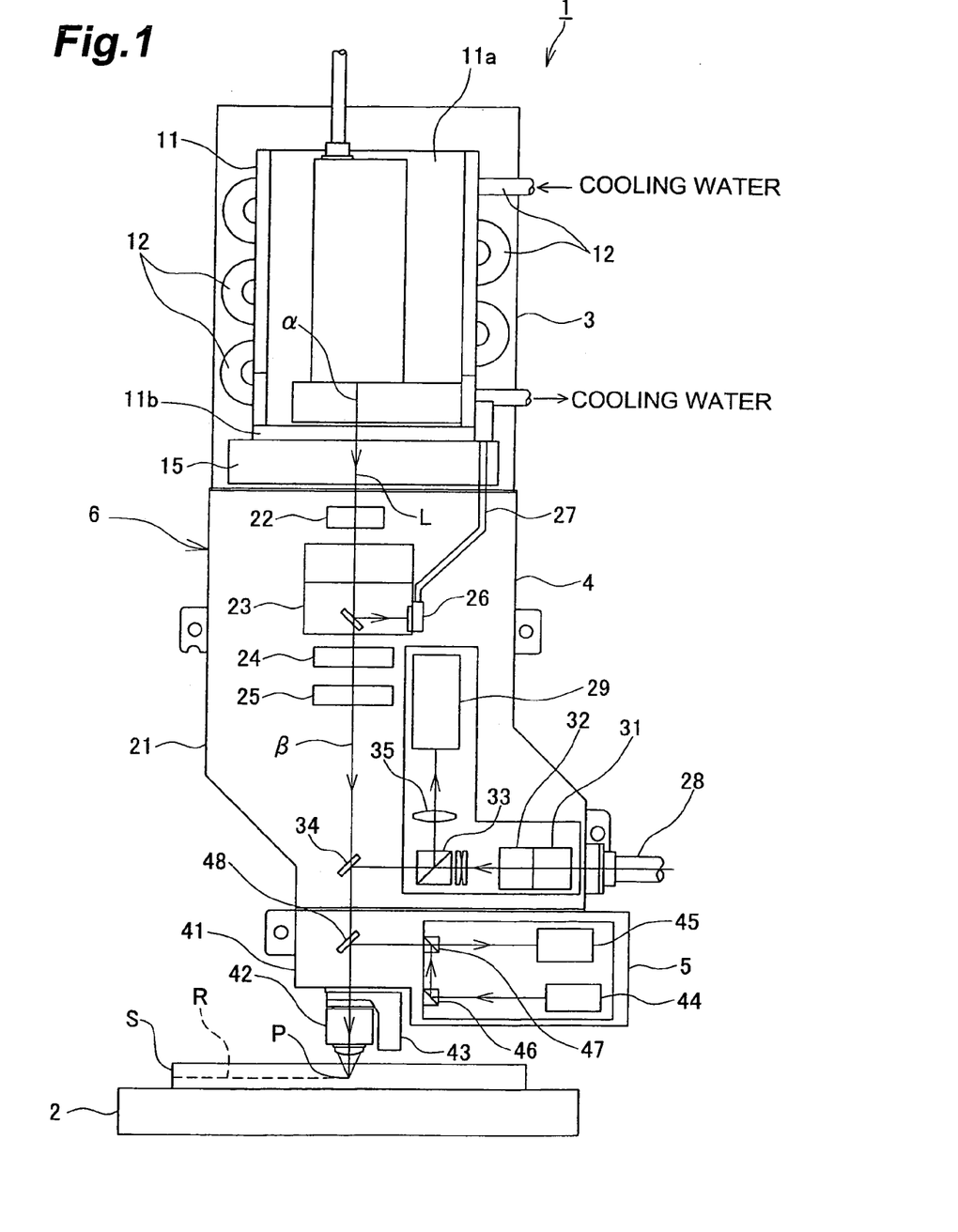
FIG. 1 is a structural diagram showing an embodiment of a laser processing device according to the present invention.

As shown in FIG. 1, a laser processing device 1 is a device for irradiating a planar object to be processed S mounted on a stage 2 with a laser beam L while positioning a light-converging point P within the object to be processed S, and forming a modified region R based on multiphoton absorption inside the object to be processed S. The stage 2 is movable and rotatable in the vertical and horizontal directions, and disposed on this stage 2 is, predominantly, a laser output device 6 composed of a laser head unit 3, an optical system body 4, and an objective lens unit 5.

The laser head unit 3 is mounted detachably on the top edge of the optical system body 4. This laser head unit 3 has an L-shaped cooling jacket 11, and a cooling tube 12 with cooling water circulating therein is embedded in a meandering shape inside a longitudinal wall 11a of this cooling jacket 11. Mounted on this longitudinal wall 11a are a laser head 13 for outputting the laser beam L in a downward direction, and a shutter unit 14 for selectively opening and closing the optical path of the laser beam L output from this laser head 13. As a result, it is possible to prevent the laser head 13 and shutter unit 14 from becoming overheated. Incidentally, the laser head 13 employs, for example, an Nd:YAG laser, and outputs a pulse laser beam having a pulse width of 1 μs or less as the laser beam L.

Further, in the laser head unit 3, an adjusting unit 15 for adjusting the inclination or the like of the cooling jacket 11 is mounted on the lower face of a bottom wall 11b of the cooling jacket 11. This adjusting unit 15 is for making the optical axis $\alpha$ of the laser beam L output from the laser head 13 coincide with the axis line $\beta$ set in the optical system body 4 and objective lens unit 5 so as to extend in the vertical direction. In other words, the laser head unit 3 is mounted on the optical system body 4 via the adjusting unit 15. Thereafter, once the inclination or the like of the cooling jacket 11 is adjusted with the adjusting unit 15, the inclination or the like of the laser head 13 is also adjusted by following the movement of the cooling jacket 11. As a result, the laser beam L will advance inside the optical system body 4 in a state where the optical axis $\alpha$ coincides with the axis line $\beta$. Incidentally, a through hole for passing the laser beam L therethrough is formed in the bottom wall 11b of the cooling jacket 11, the adjusting unit 15, and a housing 21 of the optical system body 4.

Moreover, arranged on the axis line $\beta$ within the housing 21 of the optical system body 4 are a beam expander 22 for expanding the beam size of the laser beam L output from the laser head 13, an optical attenuator 23 for adjusting the output of the laser beam L, an output observation optical system 24 for observing the output of the laser beam L adjusted with the optical attenuator 23, and a polarization adjustment optical system 25 for adjusting the polarization of the laser beam L, in the foregoing order and from top to bottom. Incidentally, a beam damper 26 for absorbing the eliminated laser beam is mounted on the optical attenuator 23, and this beam damper 26 is connected to the cooling jacket 11 via a heat pipe 27. As a result, it is possible to prevent the beam damper 26 that absorbed the laser beam from becoming overheated.

Further, in order to observe the object to be processed S mounted on the stage 2, a light guide 28 for guiding the observational optical wavelength is mounted on the housing 21 of the optical system body 4, and a CCD camera 29 is disposed inside the housing 21. The observational optical wavelength is guided inside the housing 21 with the light guide 28, and, after sequentially passing through a field stop 31, a reticle 32, a dichroic mirror 33 and so on, it is reflected with the dichroic mirror 34 disposed on the axis line $\beta$. The reflected observational optical wavelength advances downward on the axis line $\beta$ and is irradiated to the object to be processed S. Incidentally, the laser beam L permeates the dichroic mirror 34.

Then, the reflected light of the observational optical wavelength reflected at the surface of the object to be processed S advances upward on the axis line $\beta$, and is reflected with the dichroic mirror 34. The reflected light reflected with this dichroic mirror 34 is further reflected with the dichroic mirror 33 and passes through an imaging lens 35 and the like, and enters a CCD camera 29. The image of the object to be processed S imaged with this CCD camera 29 is displayed on a monitor (not shown).

Moreover, the objective lens 5 is mounted detachably to the bottom edge of the optical system body 4. Since the objective lens unit 5 is positioned at the bottom edge of the optical system body 4 with a plurality of positioning pins, it is possible to make the axis line β set in the optical system body 4 easily coincide with the axis line β set in the objective lens unit 5. At the bottom edge of the housing 41 of this object lens unit 5, a processing objective lens 42 is installed in a state where the optical axis coincides with the axis line β while intervening an actuator 43 employing a piezo element therebetween. Incidentally, a through hole for passing the laser beam L therethrough is formed in the housing 21 of the optical system body 4 and a housing 41 of the objective lends unit 5. In addition, the peak power density in the light-converging point P of the laser beam L focused with the processing objective lens 42 will be $1 \times 10^8$ (W/cm$^2$) or greater.

Further, disposed inside the housing 41 of the objective lens unit 5 are a laser diode 44 for outputting a measurative laser beam and a light receiving unit 45 for positioning the light-converging point P of the laser beam L at a prescribed depth form the surface of the object to be processed S. The measurative laser beam is output from the laser diode 44, and, after being sequentially reflected with a mirror 46 and a half mirror 47, it is reflected with a dichroic mirror 48 arranged on the axis line β. The reflected measurative laser beam advances downward on the axis line β, passes through the processing objective lens 42, and is irradiated to the object to be processed S. Incidentally, the laser beam L permeates the dichroic mirror 48.

Then, the reflected light of the measurative laser beam reflected at the surface of the object to be processed S reenters the processing objective lens 42 and advances downward on the axis line β, and is reflected with the dichroic mirror 48. The reflected light of the measurative laser beam reflected with this dichroic mirror 48 passes through the half mirror 45, enters the light receiving unit 45, and is focused on a tetrameric position detecting element composed by quartering a photodiode. It is possible to detect the position of the light-converging point of the measurative laser beam pursuant to the processing objective lens 42 in relation to the surface of the object to be processed S based on the focused image pattern of the reflected light of the measurative laser beam focused on this tetrameric position detecting element.

The laser processing method with the laser processing device 1 having the foregoing constitution is now explained. Foremost, the object to be processed S is mounted on the stage 2, and the stage 2 is moved to align the light-converging point P of the laser beam L to the inside of the object to be processed S. The initial position of this stage 2 is determined based on the thickness or refractive index of the object to be processed S, numerical aperture of the processing objective lens 42 and so on.

Next, the laser beam L is output from the laser head 13 and the measurative laser beam is output from the laser diode 44, and the stage 2 is moved so as to make the laser beam L and measurative laser beam focused with the processing objective lens 42 perform a scan on a desired line of the object to be processed S. Here, the reflected light of the measurative laser beam is detected with the light receiving unit 45, the feedback of the actuator 43 is controlled such that the position of the light-converging point P of the laser beam L constantly becomes a fixed depth from the surface of the object to be processed S, and the position of the processing objective lens 42 is fine adjusted in the axis line β direction.

Accordingly, even if the surface of the object to be processed S fluctuates for example, a modified region R pursuant to multiphoton absorption can be formed at a position of a fixed depth from the surface. When a linear modified region R is formed inside the planar object to be processed S as described above, a crack will occur with this linear modified region R as the starting point, and the object to be processed S can be cut easily along this linear modified region R with high precision.

Figure 2:
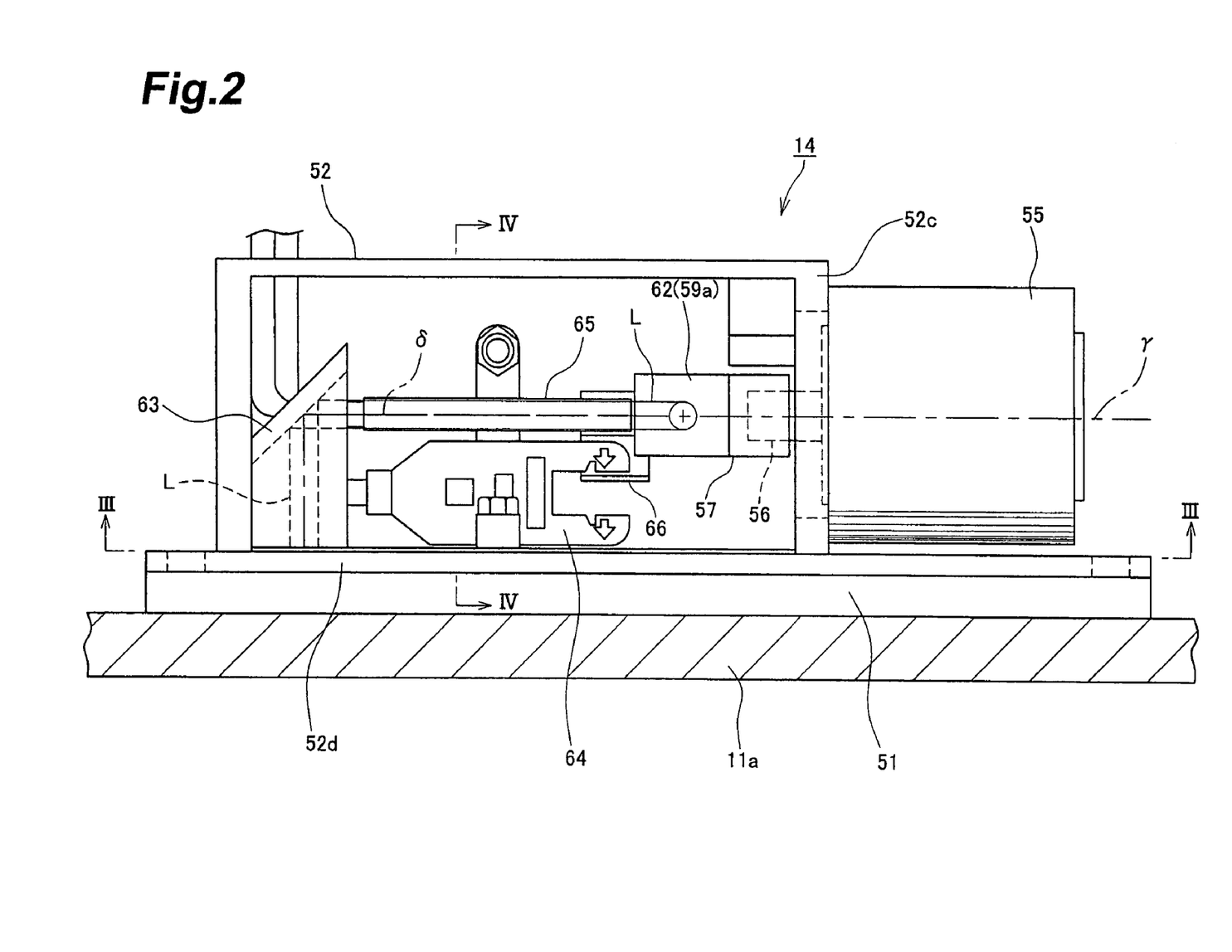
FIG. 2 is a plan view showing the internal structure of the shutter unit upon the optical path of the laser beam being closed in the laser processing device illustrated in FIG. 1.
Figure 3:
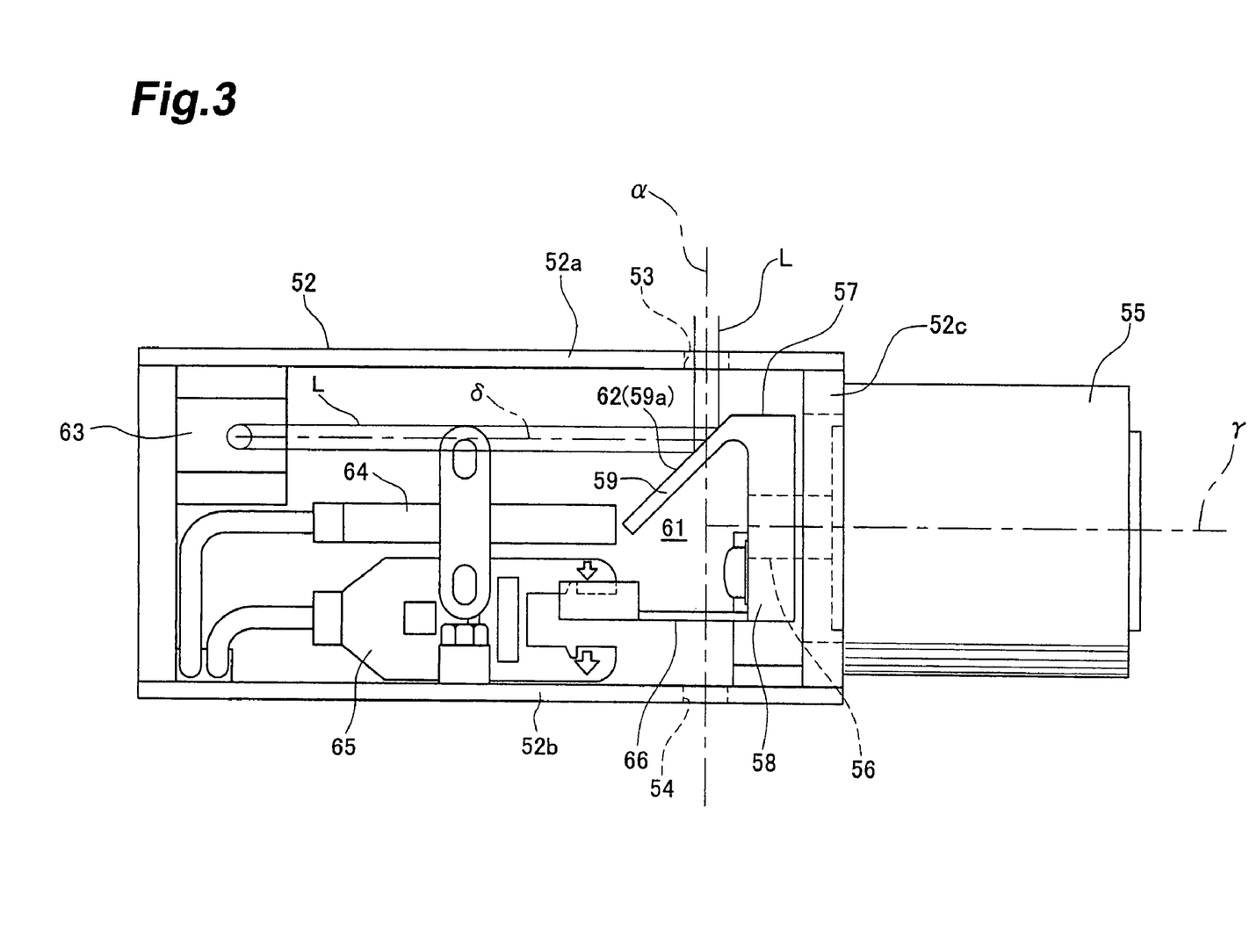
FIG. 3 is a cross section along line III-III depicted in FIG. 2.

Next, the foregoing shutter unit 14 is explained in further detail. As shown in FIG. 2 and FIG. 3, the shutter unit 14 has a hexahedron housing 52 mounted, via a spacer 51, on the front face of the longitudinal wall 11a of the cooling jacket 11 so as to extend horizontally. Formed on an upper wall 52a of the housing 52 is an entrance hole 53 of the laser beam L along the optical axis α of the laser beam L output from the laser head 13, and formed on a bottom wall 52b of the housing 52 is an output hole 54 of the laser beam L along the optical axis α of the laser beam L.

Further, mounted on one side wall 52c of the housing 52 is a drive motor 55 in a state of being disposed outside the housing 52. The rotational shaft 56 of this drive motor 55 is disposed on the axis line γ that is substantially orthogonal to the optical axis α of the laser beam L, penetrates the side call 52c, and extends inside the housing 52. As described above, by disposing the drive motor 55 outside the housing 52, an effective heat release of the drive motor 55 is enabled. Incidentally, the drive motor 55 is a step rotary solenoid motor of which the rotational shaft 56 rotates 30 degrees with a single pulse signal.

In the housing 52, a rotating member 57 is mounted on the tip of the rotational shaft 56. This rotating member 57 has a hexahedron base portion 58 directly fixed to the rotational shaft 56, and an inclined plate 59 extending toward the optical axis α side from one end of this base portion 58 and inclined substantially 45 degrees to the axis line γ side. In this rotating member 57, the triangular space sandwiched between the base portion 58 and the inclined plate 59 becomes the opening 61 positioned on the optical axis α by the rotation of the rotational shaft 56 for passing the laser beam L therethrough. Moreover, a surface 59a on the outside of the inclined plate 59 in relation to the axis line γ is formed as a mirror surface, and becomes the reflective surface 62 positioned on the optical axis α by the rotation of the rotational shaft 56 for reflecting the laser beam L. As described above, by directly mounting the rotating member 57 on the rotational shaft 56 of the drive motor 55, it is possible to seek the simplification in the structure of the shutter unit 1.

Since the foregoing reflective surface 62 has an angle of roughly 45 degrees in relation to the optical axis α when positioned on the optical axis α, the laser beam L is reflected in an substantially parallel direction to the axis line γ. An optical absorption member 63 for absorbing the laser beam L is mounted on the optical axis δ of this reflected laser beam L. Since this optical absorption member 63 is in contact with a back wall 52d on the cooling jacket 11 side of the housing 52, it is possible to prevent the optical absorption member 63 that absorbed the laser beam L from becoming overheated. Incidentally, the optical absorption member 63 is formed from the likes of aluminum, copper or ceramics, the surface thereof is roughened by a sandblast or the like, and blackbody processing is also performed to the surface thereof. As a result, it is possible to prevent all reflection of the entering laser beam L.

Figure 4:
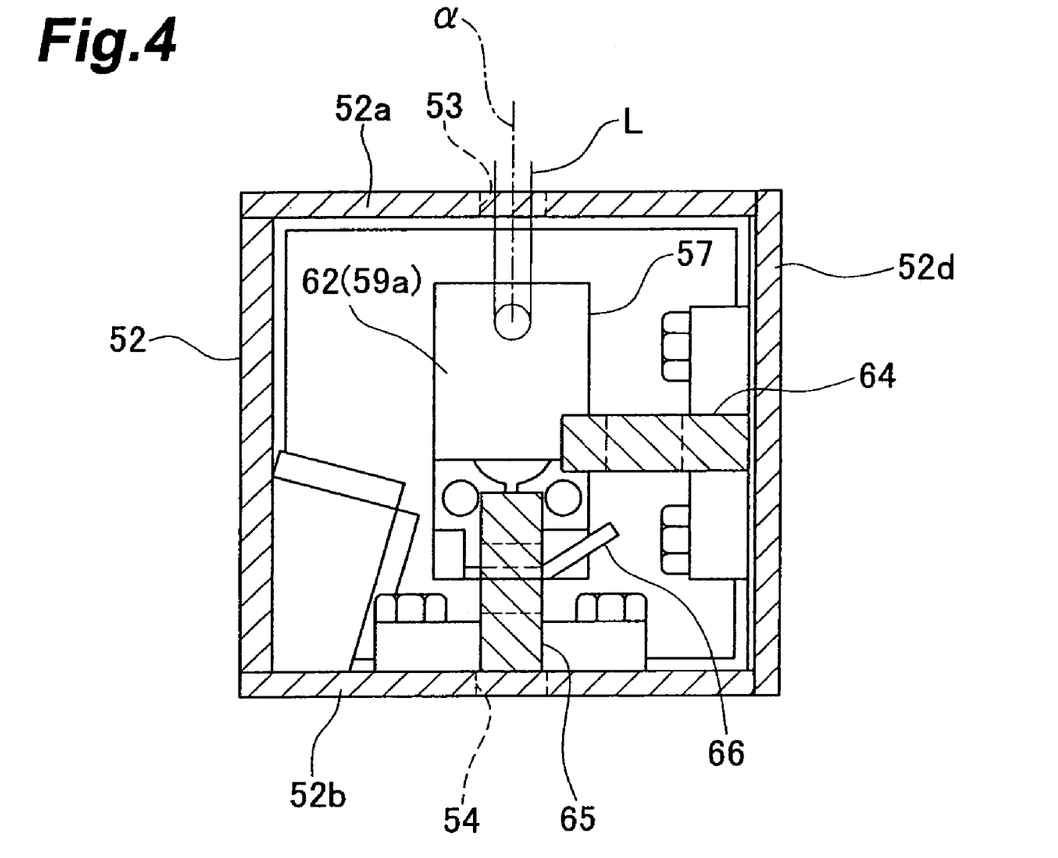
FIG. 4 is a cross section along line IV-IV depicted in FIG. 2.

In addition, as shown in FIG. 2 to FIG. 4, a first photo interrupter 64 is mounted on the back wall 52d of the housing 52, and a second photo interrupter 65 is mounted on the bottom wall 52b of the housing 52. And, mounted on the other end of the base portion 58 of the rotating member 57 is a light blocking plate 66 for blocking the optical path of the first photo interrupter 64 upon the opening 61 being positioned on the optical axis α, and blocking the optical path of the second photo interrupter 65 upon the reflective surface 62 being positioned on the optical axis α.

The operation of the shutter unit 14 having the foregoing constitution is now explained. As shown in FIG. 2 to FIG. 4, when the laser beam L is output from the laser head 13 in a state where the reflective surface 62 of the rotating member 57 is positioned on the optical axis α, the laser beam L enters the housing 52 upon passing through the entrance hole 53 formed in the top wall 52a of the housing 52, and, after being reflected with the reflective surface 62, is absorbed by the optical absorption member 63. Here, the light blocking plate 66 mounted on the rotating member 57 will block the optical path of the second photo interrupter 65. As a result, the laser processing device 1 will be able to detect that the optical path of the laser beam L is closed, and, for instance, it will be possible to move the stage 2 with the object to be processed S mounted thereon so as to position the object to be processed S in a prescribed position in relation to the processing objective lens 42.

Figure 5:
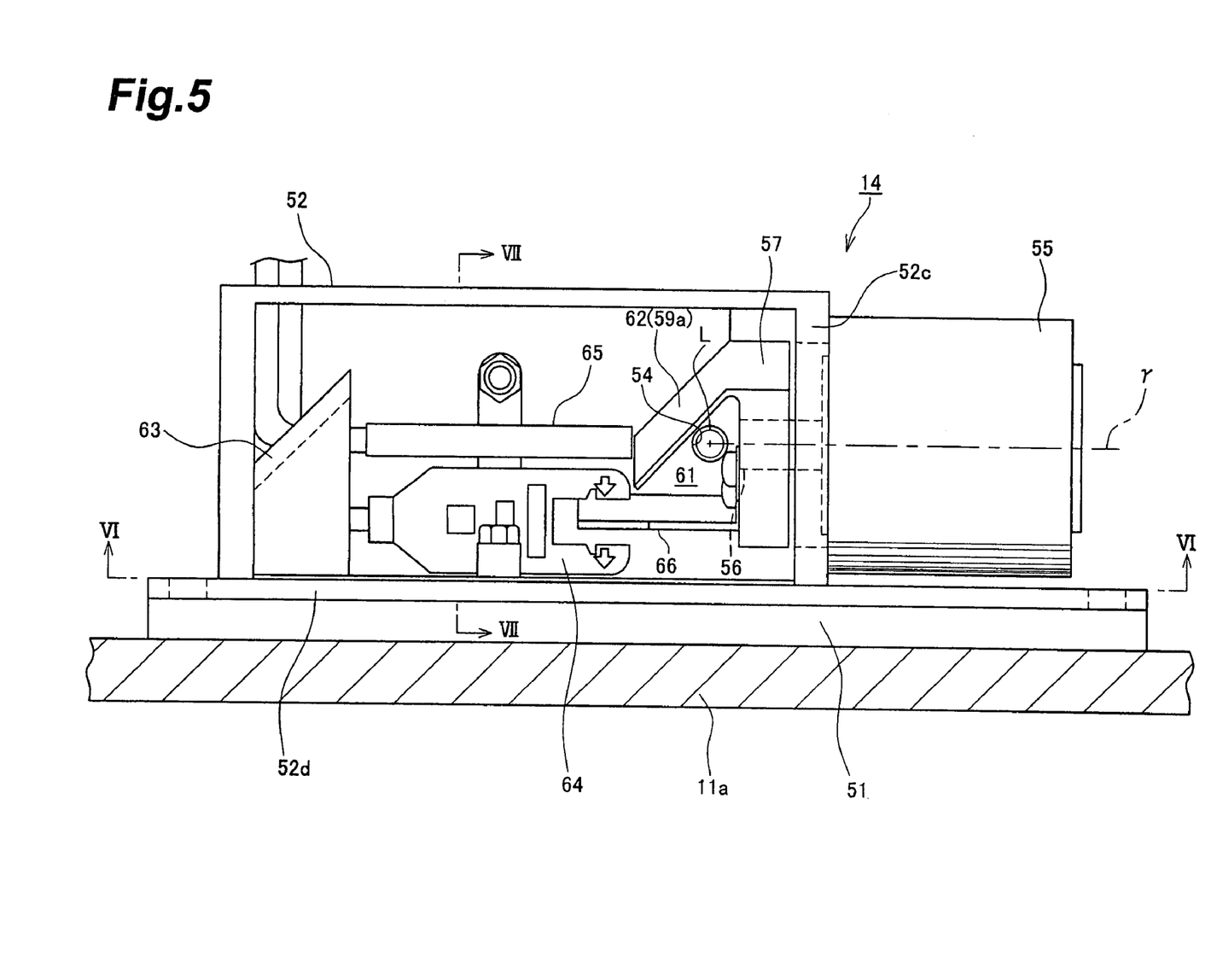
FIG. 5 is a plan view showing the internal structure of the shutter unit upon the optical path of the laser beam being closed in the laser processing device illustrated in FIG. 1.
Figure 6:
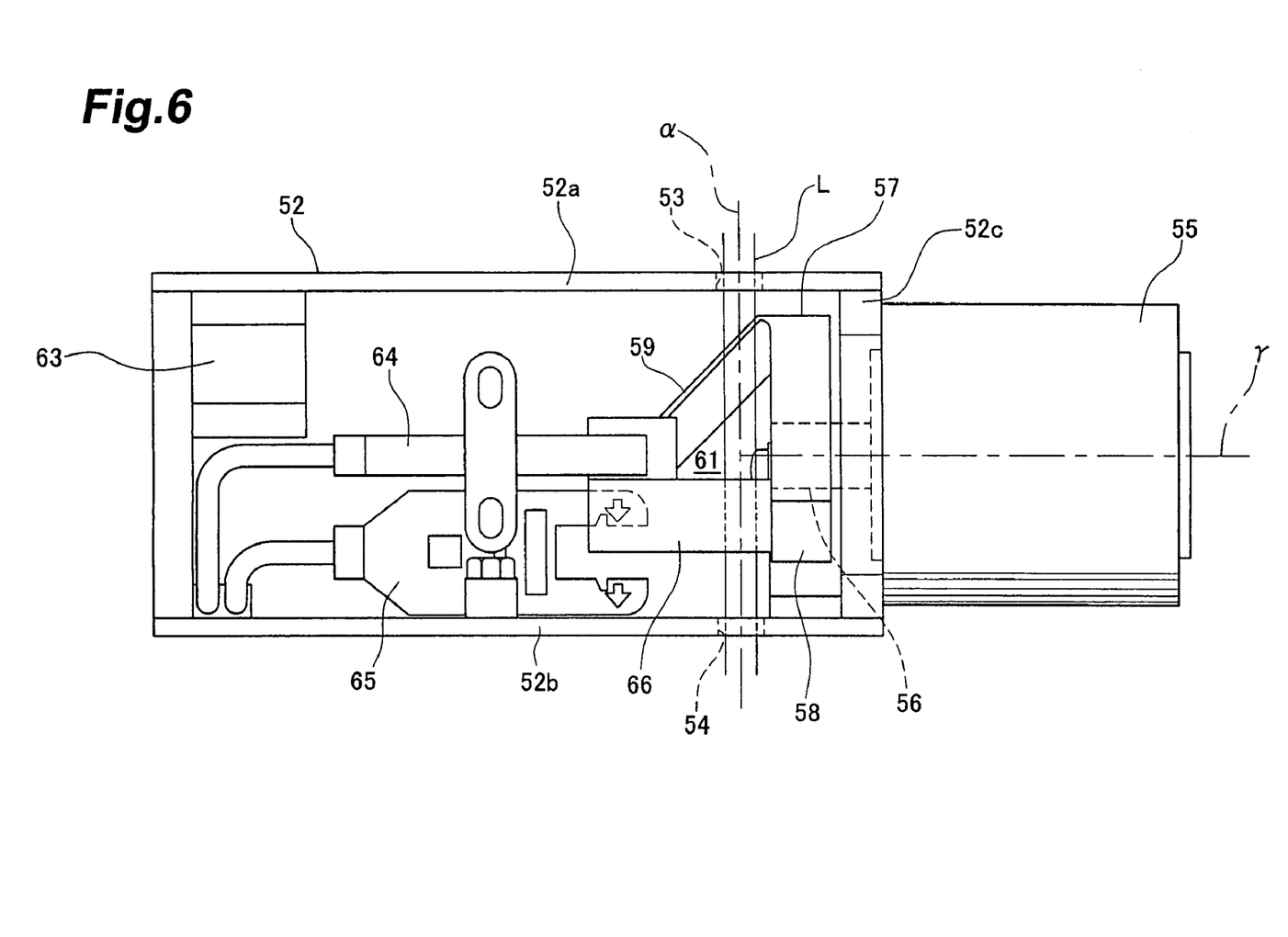
FIG. 6 is a cross section along line VI-VI depicted in FIG. 5.
Figure 7:
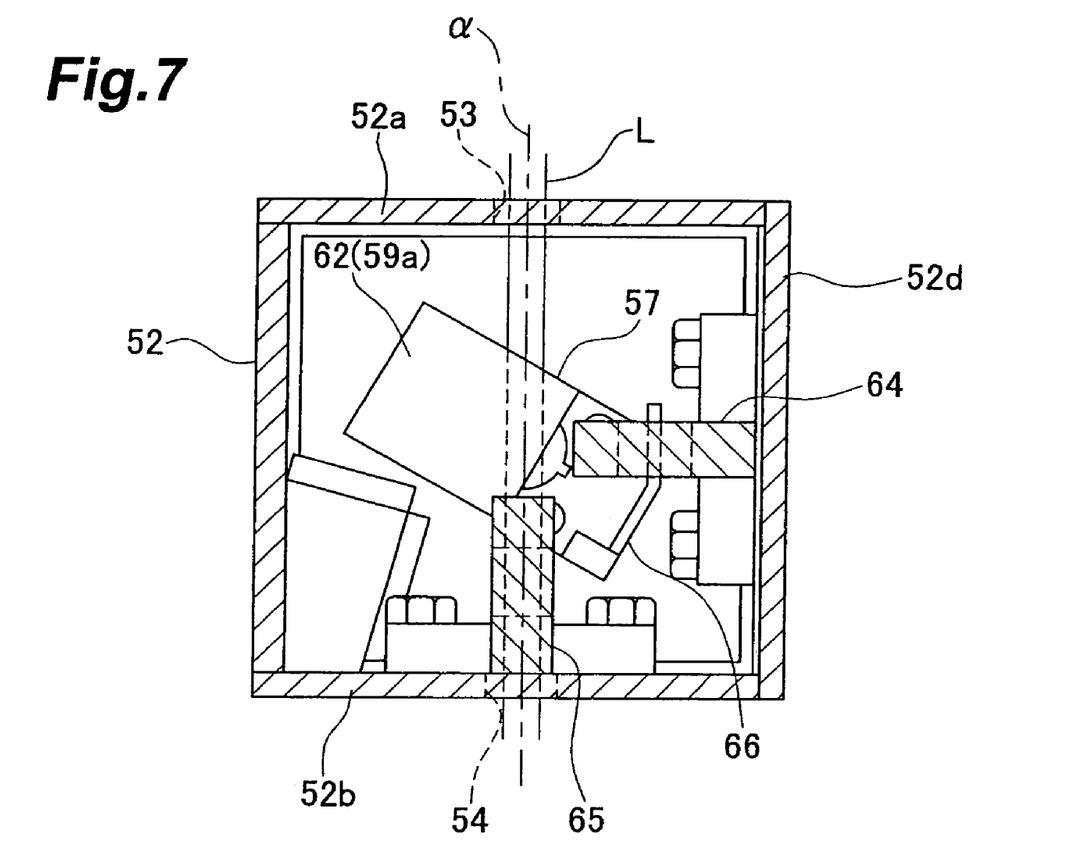
FIG. 7 is a cross section along line VII-VII depicted in FIG. 5.

Thereafter, when two pulse signals are sent to the drive motor 55 to make the rotational shaft 56 rotate 60 degrees in the counterclockwise direction when viewed from the side of the first and second photo interrupters 64, 65, as shown in FIG. 5 to FIG. 7, the opening 61 of the rotating member 57 will be positioned on the optical axis α. As a result, the laser beam L that entered the housing 52 from the entrance hole 53 will sequentially pass through the opening 61 and the output hole 54 formed on the bottom wall 52b of the housing 52, enter the optical system body 4, be focused with the processing objective lens 42, and then irradiated to the object to be processed S. Here, the light blocking plate 66 mounted on the rotating member 57 will block the optical path of the first photo interrupter 64. As a result, since the laser processing device 1 will be able to detect that the optical path of the laser beam L is opened, it will be possible to move the stage 2 with the object to be processed S mounted thereon so as to scan the laser beam L in relation to the object to be processed S.

Incidentally, when reclosing the optical path of the laser beam L, two pulse signals are sent to the drive motor 55 to make the rotational shaft 56 rotate 60 degrees in the clockwise direction when viewed from the side of the first and second photo interrupters 64, 65, so as to position the reflective surface 62 of the rotating member 57 on the optical axis α.

As explained above, in the shutter unit 1, while the optical path of the laser beam L is closed, the laser beam L reflected with the reflective surface 62 of the rotating member 57 is absorbed by the optical absorption member 63. Accordingly, when the optical path of the laser beam L is closed, it is possible to prevent the scattering of the blocked laser beam L.

Further, in the rotating member 57, since the opening 61 is formed between the base portion 58 and the inclined plate 59 and the reflective surface 62 is formed on the surface 59a on the outside of the inclined plate 59 in relation to the axis line γ, it is possible to seek the simplification of the rotating member 57 structure and the miniaturization of the rotational member 57. In addition, since the reflective surface 62 reflects the light beam L in a direction substantially parallel to the axis line γ, and the optical absorption member 63 is positioned on the optical axis δ of the laser beam L reflected with the reflective surface 62, the layout of the respective structural components in the shutter unit 1 will become efficient. Thus, it is possible to reduce the size of the shutter unit 1.

Furthermore, in the rotating member 57, since the rotational stroke of the rotating member 57 between the state where the opening 61 is positioned on the optical axis α of the laser beam L and the state where the reflective surface 62 is positioned on the optical axis α of the laser beam L will be short, it is possible to increase the switching speed of opening and closing the optical path of the laser beam L.

The present invention is not limited to the foregoing embodiments. For example, the opening 61 of the rotating member 57 is not limited to the space sandwiched between the base portion 58 and the inclined plate 59, and a through hole may be formed in the rotating member 57 and such through hole may be used as the opening 61.

INDUSTRIAL APPLICABILITY

As described above, according to the present invention, it is possible to prevent the scattering of the blocked laser beam when the optical path of the laser beam is closed, and it is further possible to reduce the size of the shutter unit.

The invention claimed is:

1. A shutter unit for selectively opening and closing the optical path of a laser beam, comprising:

a rotating member which rotates around an axis line that is substantially orthogonal to the optical axis of said laser beam, and which is provided with an opening for passing said laser beam therethrough and a reflective surface for reflecting said laser beam;

an optical absorption member for absorbing the laser beam reflected with said reflective surface; and a drive motor having a rotational shaft disposed on said axis line, wherein said rotating member has a base portion which rotates around said axis line, and an inclined plate extending from said base portion to said optical axis side and inclined toward said axis line side, and is mounted on said rotational shaft, said opening is formed between said base portion and said inclined plate, said reflective surface is formed on the outer surface of said inclined plate in relation to said axis line, and reflects said laser beam in a direction substantially parallel to said axis line, said optical absorption member is disposed on the optical axis of the laser beam reflected with said reflective surface, said drive motor is disposed outside a housing accommodating said rotating member and said optical absorption member, said optical absorption member is disposed on inside wall of said housing in the opposite side of said drive motor across said optical axis, said laser beam entering said housing enters said optical absorption member when said reflective surface closes the optical path of said laser beam by the drive of said drive motor, and passes said opening when said reflective surface opens the optical path of said laser beam by the drive of said drive motor.

2. A shutter unit according to claim 1, further comprising a first photo interrupter; and a second photo interrupter within said housing;

wherein said rotating member is provided with a light blocking plate for blocking the optical path of said first photo interrupter when said opening is positioned on said optical axis, and blocking the optical path of said second photo interrupter when said reflective surface is positioned on said optical axis; and wherein said light blocking plate is disposed on said base portion so as to face said inclined plate across said axis line, and said opening is formed between said light blocking plate and said inclined plate.

3. A laser processing device comprising the shutter unit described in claim 1 or 2; wherein said shutter unit is fixed to a cooling jacket mounted on a laser oscillator in order to cool said laser oscillator which outputs said laser beams.

* * * * *